(12) United States Patent
Guentert et al.

(10) Patent No.: US 12,372,806 B2
(45) Date of Patent: Jul. 29, 2025

(54) SPECTACLES JOINT

(71) Applicant: Mykita Studio GmbH, Berlin (DE)

(72) Inventors: Martin Guentert, Berlin (DE); Ina-Marie Kater, Berlin (DE); Moritz Krueger, Berlin (DE); Norbert Meier, Rathenow (DE); Michael Tuerr, Berlin (DE)

(73) Assignee: MYKITA STUDIO GMBH, Berlin (DE)

( * ) Notice: Subject to any disclaimer, the term of this patent is extended or adjusted under 35 U.S.C. 154(b) by 457 days.

(21) Appl. No.: 17/923,647

(22) PCT Filed: May 7, 2021

(86) PCT No.: PCT/EP2021/062212
§ 371 (c)(1),
(2) Date: Nov. 7, 2022

(87) PCT Pub. No.: WO2021/224486
PCT Pub. Date: Nov. 11, 2021

(65) Prior Publication Data
US 2023/0185110 A1    Jun. 15, 2023

(30) Foreign Application Priority Data
May 7, 2020    (DE) .......................... 102020112407.4

(51) Int. Cl.
*G02C 5/22*    (2006.01)
(52) U.S. Cl.
CPC ......... *G02C 5/2227* (2013.01); *G02C 5/2209* (2013.01); *G02C 2200/26* (2013.01)
(58) Field of Classification Search
CPC . G02C 5/2227; G02C 5/2209; G02C 2200/26
See application file for complete search history.

(56) References Cited

U.S. PATENT DOCUMENTS 4,461,548 A * 7/1984 Drlik ................... G02C 5/2227
                                                                351/153
6,585,372 B1    7/2003 Nagayoshi
(Continued)

FOREIGN PATENT DOCUMENTS

DE        4339517 C1    5/1995
EP        1584968 A1    10/2005
(Continued)

OTHER PUBLICATIONS

International Preliminary Report on Patentability issued Nov. 8, 2022, in PCT Application No. PCT/EP2021/062212.
(Continued)

*Primary Examiner* — Tuyen Tra
(74) *Attorney, Agent, or Firm* — KRIEGSMAN & KRIEGSMAN

(57) ABSTRACT

The present invention relates to a screwless, resilient spectacle joint.
Spectacle frame joint, the joint consisting of a front part, a temple part and a compression spring element, the front part consisting of a cuboid opened towards the front, along one side and on the inside, and inwardly directed axes of rotation are arranged on the mutually opposite inner sides of the open cuboid, the temple part being constructed in form of a holding lug, the holding lug being insertable into the cuboid of the front part and hinging hooks in form of recesses are arranged in two opposing outer surfaces of the holding lug, which are suspendable in the axes of rotation of the front part, whereby the front part and temple part are interconnectable in an articulated manner, the compression spring element being arranged between the front part and temple part, thereby fixing the temple part movably on the axes of rotation of the front part.

12 Claims, 4 Drawing Sheets

(56) References Cited

U.S. PATENT DOCUMENTS

Figure 1:
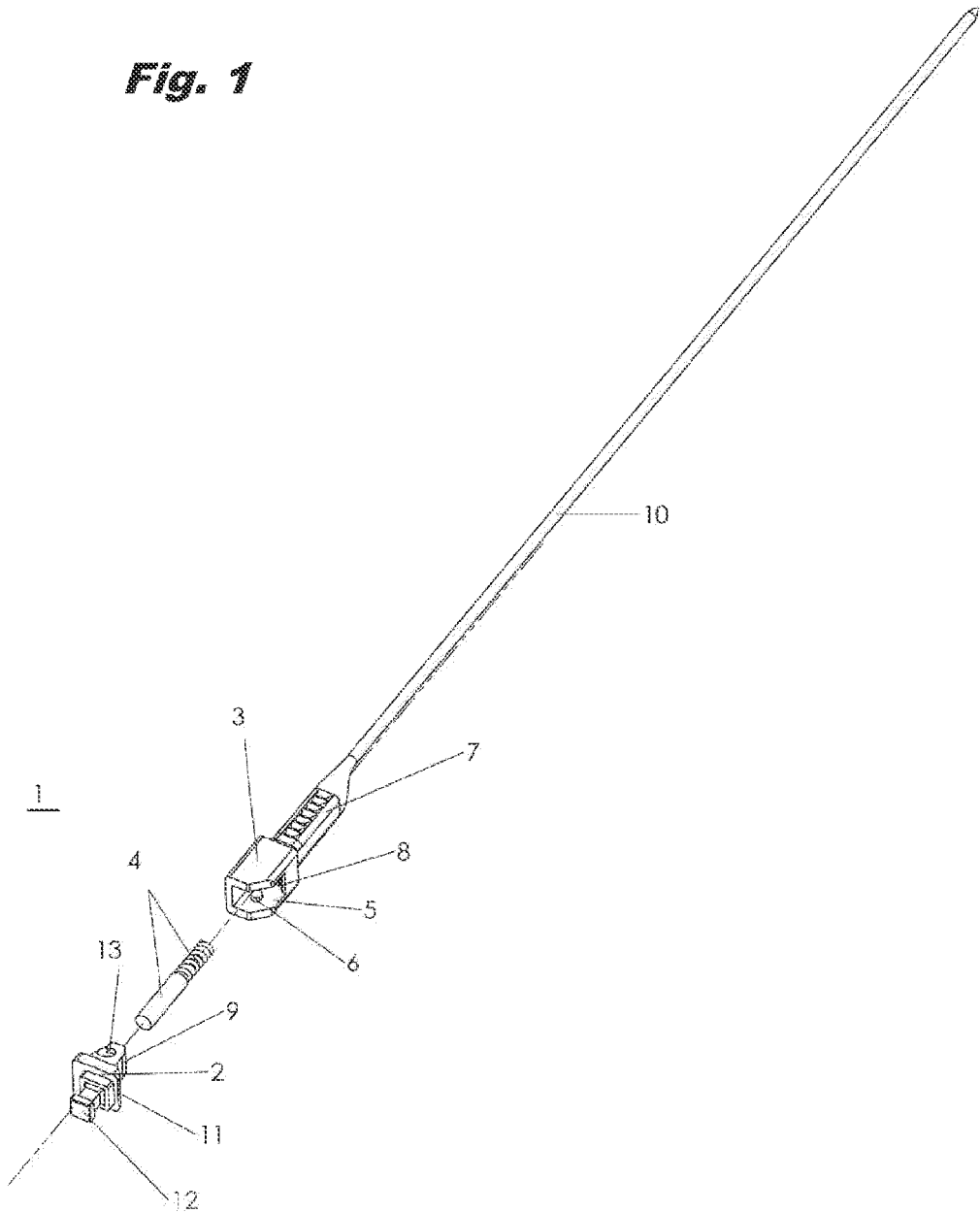

2010/0091237 A1    4/2010  Medana
2019/0162983 A1    5/2019  Montalban

FOREIGN PATENT DOCUMENTS

| JP | 2002268017 A | 9/2002 |
| JP | 2002296547 A | 10/2002 |
| JP | 2004258329 A | 9/2004 |
| JP | 2013148826 A | 8/2013 |

OTHER PUBLICATIONS

International Search Report mailed Sep. 9, 2021, in PCT Application No. PCT/EP2021/062212.
Written Opinion mailed Sep. 9, 2021, in PCT Application No. PCT/EP2021/062212.

* cited by examiner

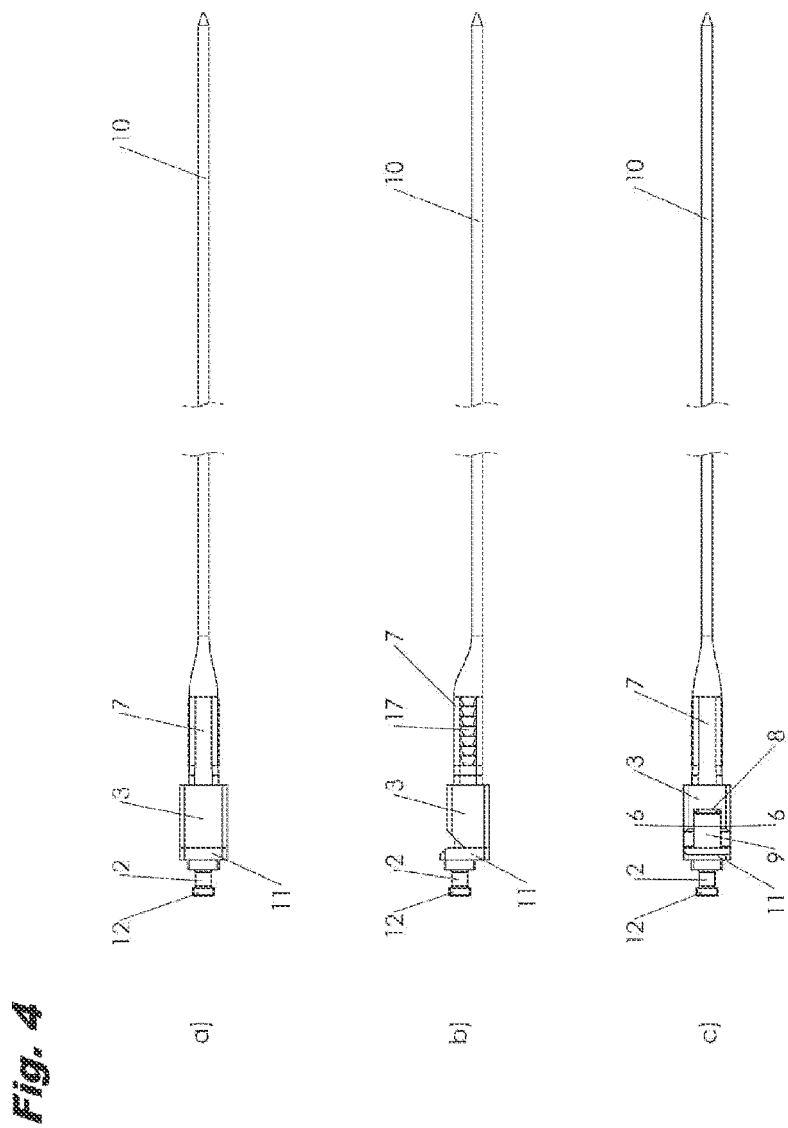

SPECTACLES JOINT

The present invention relates to a screwless, resilient spectacle joint.

DE 43 39 517 C1 describes a spectacle frame with temples which are arranged horizontally pivotably on a glass-side connecting element, wherein because of the presence of joints the vertical moveability of the temples is still possible. The disadvantage of the prior art is that the spectacle temples are not arranged in a fixed position, neither in the open nor in the closed state. In addition, the adjustable spring force must be used to fix the spectacle temples, depending on the environment in which the user wishes to use the glasses.

U.S. Pat. No. 6,585,372 B1 describes a connecting structure between a temple arm and a support for spectacles, which produces an appropriate resistance to a characteristic variation in the type of deployment and folding movement of the spectacle arm, this being produced by the temple arm.

JP 2002-268017 A discloses the construction of a temple connection structure by simply utilizing the restoring force of an elastic spring member, thereby improving its assembling work, reducing the manufacturing cost, and preventing a huge enlargement of a circumferential end piece to assemble the spring member therein.

In JP 2013-148826 A the construction of a temple connecting structure of spectacles by snap-in structure is disclosed, the structure and assembly work of which are simple.

US 2010/0091237 A describes a resilient joint element for a spectacle frame, the joint element comprising a carriage disposed in a housing and a return spring of the carriage. The carriage comprises a guided portion which operates with a guided zone of the frame and having an end forming a joint which extends outwardly of the housing. The spring operates under pressure between a rear stop integrated in the carriage and a front stop.

It is therefore the problem of the present invention to overcome the disadvantages of the prior art and to provide a spectacle joint which consists of only a few components and enables the joint parts to be assembled without tools.

The problem is solved by a spectacle joint with the features of the main claim. Advantageous developments of the spectacle joint according to the invention are characterized in the dependent subclaims.

The object of the invention is a joint for a spectacle frame with temples, wherein the joint consists of a front part, a temple part and a compression spring element, wherein the temple part consists of a cuboid open towards the front, along one side and on the inside, and short inwardly directed axes of rotation are arranged on the opposing inner sides of the open cuboid, and wherein the front part is constructed in the form of a holding lug, wherein the holding lug is formed to be insertable into the open cuboid of the temple part, and wherein hinging hooks in the form of recesses are arranged in two opposing outer surfaces of the holding lug, which can be hung in the short axes of rotation of the temple part, whereby the front part and the temple part can be hingedly connected with one another and the compression spring element is arranged between the front part and the temple part in such a way that the front part is fixed movably on the axes of rotation of the temple part.

Preferred is a joint according to the invention, wherein the temple part has an inlay body which extends rearwardly from the temple part to the spectacle temple, wherein the insert body is formed to be insertable into the temple. Herein it is particularly preferred that the insert body has a cavity to form a spring housing and that the temple part has a hole on the rear wall of the open cuboid, so that the compression spring element can be inserted through the temple part into the cavity of the insert body.

Preferred is further a joint according to the invention, wherein the front part further comprises a base plate which is arranged at the front part of the holding lug.

Herein it is particularly preferred that the base plate is formed in such a way that in the opened state of the spectacle temple, the base plate covers the side of the cuboid of the temple part, which is open at the front. It is further particularly preferred that a connecting element is arranged on the forward-facing side of the base plate, which is provided for fastening the frame for the spectacle glasses.

Furthermore, a particularly preferred joint according to the invention is furthermore one in which the holding lug has a radius at the outside rear and a rounded edge at the inside rear.

Furthermore, a joint according to the invention is particularly preferred, wherein the compression spring element consists of a compression spring and a pin, wherein the pin is arranged in the direction of the holding lug.

Furthermore, a joint is preferred, in which the holding lug on the side directed to the pin is formed in such a way that at an angular range of the joint parts of 90° to 108° relative to one another a constant compressive force is exerted on the compression spring.

Thus, a joint is also preferred, whereby the holding lug on the side directed to the pin is formed in such a way that at an angle range of 0° to 18° between the front part and the temple part, the compression spring no longer experiences any additional relaxation and the suspension is thus annulled shortly before the temple is driven into the front.

Further preferred according to the invention is a joint according to the invention, wherein the pin is fixedly or releasably connected to the compression spring.

A further object of the present invention is a joint for a spectacle frame with temples, wherein the joint consists of a front part, a temple part and a compression spring element, wherein the front part consists of a cuboid which is open towards the front, along one side and on the inside, and short, inwardly directed axes of rotation are arranged on the mutually opposite inner sides of the open cuboid, and wherein the temple part is constructed in the form of a holding lug, wherein the holding lug is formed to be insertable into the open cuboid of the front part and hinging hooks in the form of recesses are arranged in two opposing outer surfaces of the holding lug, which can be suspended in the short axes of rotation of the front part, whereby the front part and the temple part are connectable to one another in an articulated manner and the compression spring element is arranged between the front part and the temple part in such a way that the temple part is fixed movably on the axes of rotation of the front part.

Furthermore, a joint according to the invention is preferred, wherein the compression spring element is in the form of a leaf spring and/or in the form of an elastomer part and/or moulded rubber part.

Figure 2:
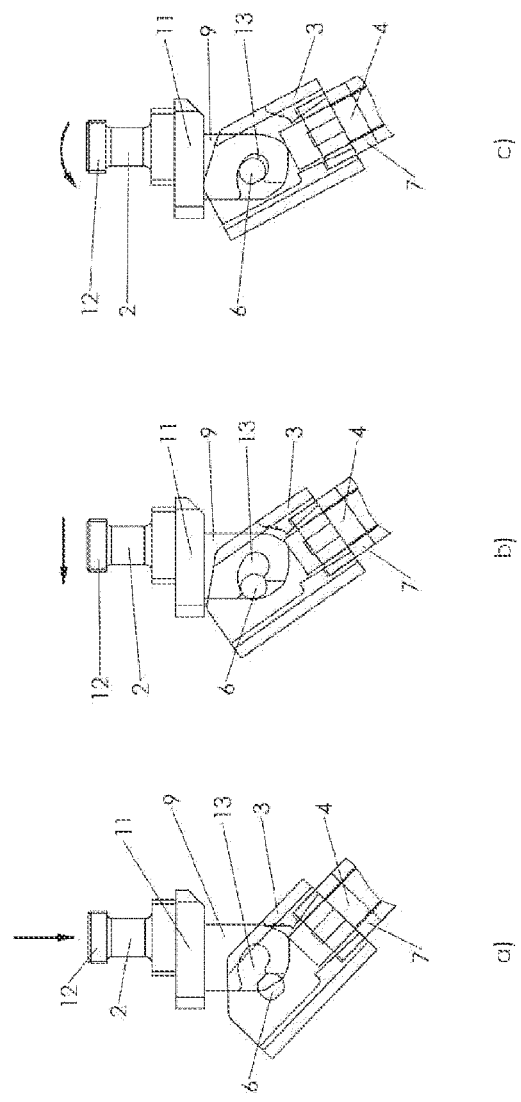
Figure 3:
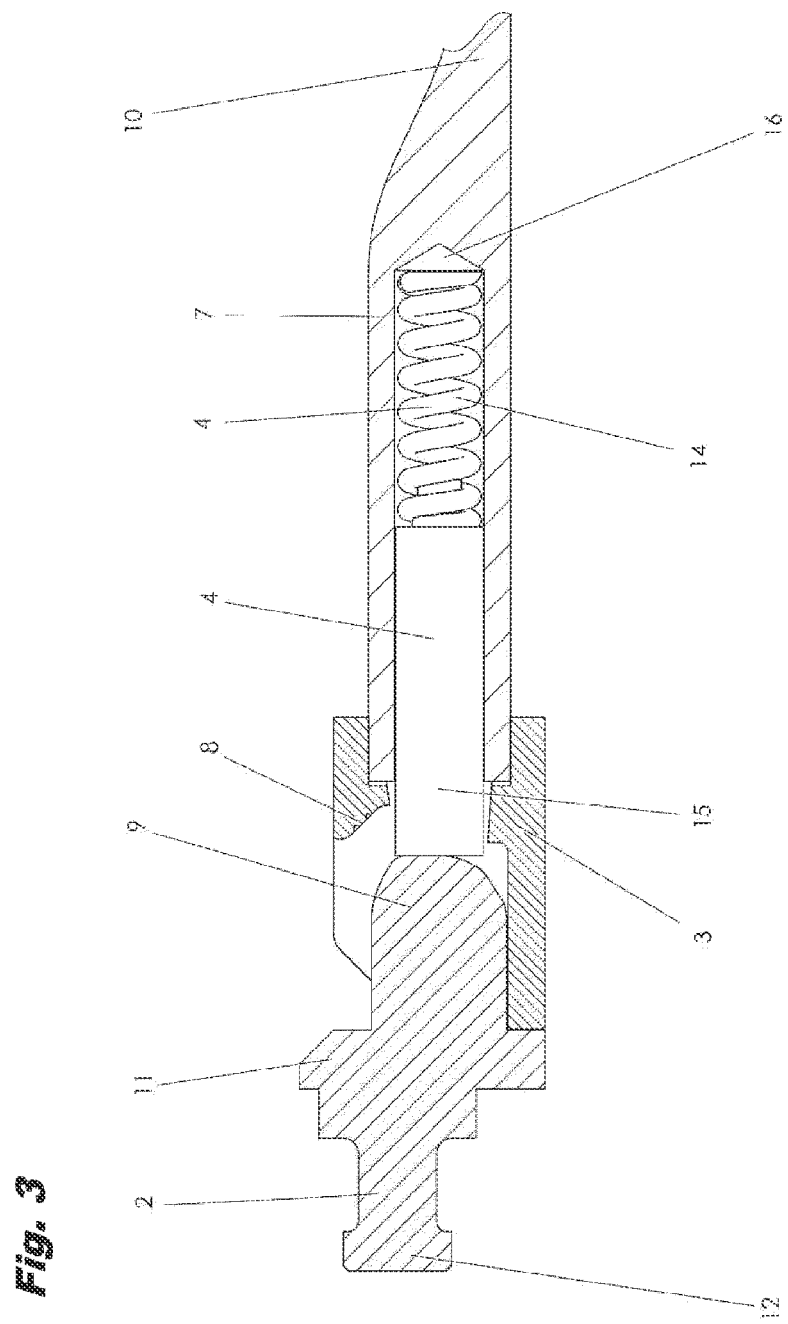

The present invention is explained in more detail with the accompanying drawings. It shows:

FIG. 1 a perspective exploded view of a spectacle joint according to the invention;

FIG. 2 partial sectional views of the spectacle joint according to the invention in three state positions during hanging in of the joint;

FIG. 3 a sectional view of the spectacle joint according to the invention; and

FIG. 4 three top views of the spectacle joint according to the invention in three different arrangement positions along the longitudinal axis.

DEFINITIONS

The position and direction indications given herein are to be understood as follows:
- front: direction of view of the wearer of the spectacle;
- back: opposite to front (towards the ear);
- inside: head-side, towards the centre of the wearer's body;
- outside: facing the head, away from the centre of the spectacle wearer's body.
- Joint position 180°: temple fully open.
- Joint position 90°: temple completely folded in.

The joint according to the invention has two defined end positions, namely open and closed, into which it snaps when the spectacle temple is opened and closed. This is achieved by means of the interaction of a spring-loaded pin and a non-circular running surface. The front side and temple side joint-parts, namely the front part and the temple part, can be assembled and disassembled without tools by hanging in the pivot shaft into a hinging hook.

The spectacle temple, which is made of plastic or metal, for example, preferably contains a metal core or consists entirely of metal. Particularly preferred is the variant of a metal core in a plastic temple, which is called a temple insert.

A compression spring, preferably a spiral spring made of spring steel, and a beforehand preassembled or loosely inserted pin, for example made of metal or ceramic, are movably mounted in a spring housing in the front part of the temple insert. The spring housing may have barbs or other surface structures on the outside which prevent the slipping out of the surrounding plastic of the spectacle temple. The cross-section of the spring housing may be made round or polygonal, preferably as an anti-twist device. The insert can be introduced and fixed into the plastic temple by means of washing-in, for example by means of vibration or heating, injection-moulding, riveting, gluing or screwing.

According to the invention, it is further intended that the compression spring can also be in the form of a leaf spring. A spring element in the form of elastomeric or moulded rubber parts is also preferred.

At the front end of the temple insert, the temple-side joint part is attached. This is preferably made of steel by metal injection moulding and welded or soldered to the insert, but can also be made in one piece with the insert. The joint part consists of a box open to the front and to the inside, in which two short axes of rotation are located at the top and bottom. The inner front edge of the box has a chamfer which gives the joint the necessary freedom of movement when assembled. The rear wall of the box has a bore through which the spring element can be mounted and dismounted. The shortness of the axes leaves enough space for this.

The front side joint part is preferably also made in one piece from steel by metal injection moulding, but can also be produced by milling or extrusion/milling. The front of the spectacles may be made of plastic or metal. A front made of thermoplastic is particularly preferred. The front side joint part has a mounting device which allows it to be inserted into a plastic front. This can be done by hot washing in, vibration welding, gluing, riveting or screwing. It can also be pressed to another metal part at the front side of the front. Particularly preferred is the washing-in of a so-called washing-in fungus by vibration and pressure.

The washing-in fungus or the rivet holder or another suitable mounting device, is arranged on a base plate which defines the positioning of the front side joint part on the plastic and is intended to prevent it from sinking too deeply. The base plate can also serve as a stop for the temple side joint part. The base plate is not necessary for the movement of the joint, but prevents the unintentional disassembly of the joint in any temple position when mounted.

On the base plate there again is a lug, preferably in the form of a holding lug, which fits into the temple side joint box and has a radius on the outside at the back and a slightly rounded edge on the inside at the back. In the assembled state, the edge forms the non-circular running surface for the temple side spring element. The lug can also serve as a stop for the temple side joint part. On the upper and lower side of the lug there is an outwardly open hook geometry which serves as a bearing for the axis pins of the temple part. This hook geometry enables the temple to be mounted on the front without tools, similar to a bayonet principle. By a movement of the temple relative to the front from the outside to the inside at an angle of approx. 45°, the spring-loaded pin can be pressed into the spring housing with the inside of the front side lug, thus bringing the axes into the hook from the outside. If one now releases the temple, the spring element pushes the axis into the hook and the joint can be opened and closed at an angle of 180° to 90°. Thereby the angular running surface of the pin pushes it back furthest relative to the front at a temple position of 45°. In the 90° and 180° positions, on the other hand, the spring is at its most relaxed. This results in defined end positions for the temple movement.

In a further embodiment of the joint according to the invention, it is intended that in the angular range from 108° to 90°, i.e. shortly before the temple is completely folded in, no further springing is provided in the direction of the front. For this purpose, the running surface of the holding lug is shaped in such a way that before the stop of the temple against the front, in an angular range of 108° to 90° no spring force acts any longer inwards, but only a gear regulation takes place. The spring thus remains constantly compressed on the last section of the temple's way. The advantages of this embodiment are that by constant pressure of the temple on the front and on the respective other temple, exerted by the spring, a deformation of the plastic and a deformation of the spectacles as a whole can be prevented over a longer period of time and under the influence of heat. Since the spring thus remains constantly compressed on the last section of the temple's way, an unwanted deformation of the frame can thus be prevented.

The spring force and thus the spring behaviour of the temple can be varied by the variables length, number of coils and wire thickness of the compression spring and length of the pin. Thus, the behaviour of the joint can be changed without having to replace it.

The joint can also be dismantled without tools by performing a movement of the temple forwardly and outwardly relative to the front and at an angle, temple to front, of approx. 45°. Thereby the replacement of the spring element is possible, should the spring wear out over time. Lubrication of the mechanism with a little oil or grease is recommended to minimize abrasion. Application of a thick grease to the spring before it is assembled has two desirable advantages: The spring housing acts as a pump reservoir for the lubricant and because of the viscosity of the grease the likelihood of the spring, including the pin, being lost during disassembly is significantly minimized.

With the construction according to the invention, spectacle joints with a minimum construction height of 4 mm can be realized. However, depending on the design of the spectacles, the construction height can be chosen in any way. A further minimization is limited by the practicable spring diameters and the minimum wall thicknesses of the spring housing and the plastic sheathing thereof, but it is conceivable. Greater construction heights are possible without any problems. The joint parts can be finished by polishing, PVD coating or electroplating. The herein mainly described mounting that tops on the plastic is preferred, but joint positions moved to the inside of the temple can be realized, making the joint invisible from the outside when the temple is open, which also allows a high degree of flexibility in the choice of temple construction height.

According to the invention, it is further intended that the temple part, preferably including the temple insert, is completely enclosed in the plastic of the temple. Thus, the joint is no longer visible from the outside. It is particularly preferred that the plastic is acetate, in particular cellulose acetate, or polyamide, in particular laser-sintered polyamide 12.

Preferred according to the invention are different embodiments of the attachment of the spectacle joint according to the invention to the spectacle frame. The attachment of the joint according to the invention to the frame can be effected by washing in, riveting, screwing, gluing, potting, pressing. If components of the front of the spectacle frame consist of metals or alloys, the attachment of the joint may be effected by welding or soldering or other methods for joining metallic materials. The respective joining methods and processes mentioned herein require different optimum shaping of the front part of the joint, such as, for example, a washing-in fungus, screw dome, glue-in pin and the like, and can, however, be varied independently of the joint function according to the invention.

Also preferred according to the invention are different embodiments for attaching the spectacle joint according to the invention to the spectacle temple, which can also be formed variably. Herein the washing-in, hot-riveting, hot-forming or press-fitting of the joint according to the invention into a plastic temple or a temple end is preferred. However, the joining of the components can also be performed by gluing, screwing, riveting, potting, pressing or other known joining techniques. If components of the spectacle temple are made of metals or alloys, the attachment of the joint can be performed by welding or soldering or other methods for joining metallic materials. Furthermore, according to the invention, it is intended for plastic temples to form a temple insert in the form of wire or sheet metal, which connects directly to the spring housing of the spectacle joint according to the invention. According to the invention, it is further intended to manufacture a metal temple with the spectacle joint according to the invention in one piece, in that the spring housing is not continued in a temple insert, but in a metal temple.

With the arrangement of the components described so far, wherein the holding lug is attached front side and the axis, pin and spring are arranged in direction to the temple side assembly, the elongated spiral spring is space savingly arranged in the temple body. However, according to the invention, a reverse orientation of the components is also intended. By shortening and widening the spring element or by using a different spring concept, for example in the form of a leaf spring or an elastomer or moulded rubber part, this spring concept can be accommodated in the front and thus the entire spectacle joint according to the invention can be mounted in a reversed arrangement. This arrangement too represents an embodiment according to the invention of the spectacle joint according to the invention. It is clear to the skilled person that this form of arrangement of the components can also be derived in part from the aforementioned embodiments in the reverse arrangement of the components, and this embodiment can be derived in its entirety from the present description.

The following embodiments explain the invention in more detail without limiting the scope of the invention. The invention and its embodiments are now described in more detail with reference to the accompanying figures.

FIG. 1 shows a perspective exploded view of a spectacle joint 1 according to the invention. The spectacle joint 1 consists of the front part 2 and the temple part 3, which are formed to be mountable into each other. The front part 2, which can be integrated into the front of the spectacles by means of the mounting device 12, has a holding lug 9, which is arranged in the direction of the spectacle temple. Hinging hooks 13 are arranged on the outer surfaces of two opposing side surfaces of the holding lug 9. The hinging hooks 13 can, for example, be milled into the respective side surfaces of the holding lug 9. The dimensions of the holding lug 9 are such that the holding lug 9 can be inserted and hooked in into the hollow body of the temple part 3 of the joint 1. The front part 2 further comprises a base plate 11 which fulfils various purposes. The base plate 11 can serve as a stop on the temple part 3 and/or prevent the unintentional disassembly of the joint parts 2,3. The second part of joint 1 is called the temple part 3. The temple part 3 has a device for receiving the front part 2. This receiving device is created in the form of a cuboid which is open on the inside and wherein two side surfaces of the cuboid, namely the front side facing the front part 2 in the assembled state of the joint, is completely removed and a longitudinal side extending from the front side of the cuboid in the direction of the temple insert 10 is partially removed, the remaining part of the cuboid side surface comprising a chamfer 8 at the forwardly directed side edge. Advantageously, the corners of the opposite cuboid side face are chamfered to allow the holding lug 9 to be hung in into the open cuboid. On the inner sides 5 of the cuboid, which are the inner side surfaces of the opposite side surfaces of the cuboid, short axes of rotation 6 are arranged. The axes of rotation 6 have a height which allows the hooking of the hinging hooks 13, but furthermore have sufficient distance to each other to guide the spring element 4 through during the assembly of the joint. In order to insert the spring element 4 into the temple insert 10, the receiving device in the form of the cuboid has an opening (not shown) on the side facing the temple insert 10. This opening is then in spatial connection with the spring housing 7, which is part of the temple insert. The spring housing accommodates the spring element 4 so that spring element 4 exerts the required spring tension on the joint.

The third component of the joint 1 is spring element 4. Spring element 4 is inserted into the spring housing 7 during assembly of the joint. Spring element 4 then acts with the spring force on the holding lug 9 of the front part 2 and causes the short axes of rotation 6 and the hinging hooks 13 to be under spring tension. In the open and closed state of the joint, spring element 4 is in a relaxed state so that the reduction of the spring force remains low.

FIG. 2 shows partial sectional views of the spectacle joint according to the invention in three state positions during the hanging in of the joint. For assembly of the joint 1, the spring element 4 is first inserted into the spring housing 7 of the temple part 1. FIG. 2*a* shows how the holding lug 9 of the front part 2 is inserted into the open cuboid of the temple part 3. The holding lug 9 is oriented in such a way that the open side of the hinging hooks 13 are aligned with the axes of rotation 6. At the same time, pressure is exerted on spring element 4 by holding lug 9 so that the spring element 4 is under tension. When the axis of rotation 6 engages the hinging hook 13, the holding lug 9 is displaced laterally in the direction of the axes of rotation 6, as shown in FIG. 2b. In FIG. 2b it is now shown that the axes of rotation 6 are enclosed by hinging hook 13 and the front part 2 is now movably mounted and can be transferred to the open state of the joint, as shown by the arrow above mounting device 12. When the joint is in the open state, the spring element 4 rests against the rear end of holding lug 9 and is in a relaxed state. By moving front part 2 in the opposite direction, holding lug 9 exerts pressure on spring element 4 and when the closed state is reached, spring element 4 relaxes and then rests against the side wall of the holding lug.

Herein it is particularly preferred that the running surface of the holding lug is shaped in such a way that, before the temple stops against the front, in an angular range of 108° to 90° there is no longer any spring force acting inwards, but only a gear adjustment takes place.

FIG. 2 thus shows how the tool-free assembly of the joint can be carried out by joining the components, namely the front part 2, the spring element 4 and the temple part 3.

FIG. 3 shows a sectional view of the spectacle joint according to the invention. A joint 1 is shown in the open state. The front part 2 is mounted in into the temple part 3. The axes of rotation and the hinging hooks are not shown due to the figure of the sectional view. Holding lug 9 rests against spring element 4. Spring element 4 itself consists of several components. Firstly, compression spring 14 is shown, which rests against or is firmly or detachably connected to a pin 15. Pin 15 is preferably made of a material which has the same or a lower hardness than front part 2 and/or holding lug 9, in order to minimize abrasion during movement of the joint. This makes it possible to replace the pin 15 if necessary if the abrasion is too high. The materials may be selected from nickel silver, bronze, softer steels or low friction plastics. The forwardly directed part of the pin 15 may also be rounded up to hemi-spherical in shape. According to the invention, it is also intended that only the forwardly directed part of the pin 15 is selected from the materials previously described. However, according to the invention, it is also intended that the pin 15 or the forwardly directed part of the pin 15 is coated with a slidable plastic. Spring element 4 is inserted in spring housing 7. Spring housing 7 is in the form of a cavity, preferably in the form of a bore in the interior of the temple insert 10.

In a further preferred embodiment, the components in sliding movement with each other, namely holding lug 9 and the front of the pin 15 resting against the holding lug 9, can be formed hemispherical or rounded in some other way. This leads to less friction, as the area of the surfaces lying against each other is formed to be smaller. Thereby too, the frictional effect between the components can be reduced.

In FIG. 4 three views of the spectacle joint according to the invention in three different positions along the longitudinal axis are shown.

FIG. 4a shows a top view of the side area of the opened joint. Herein, due to the shape and dimensions of the base plate 12, the joint itself is not visible. FIG. 4b shows a top view of the upper or lower area, respectively, of the opened joint. The joint itself is also not visible here. Only the beveled edges of the cuboid for receiving the holding lug are visible. For improvement of the mounting possibilities of the temple insert in a plastic or other material, a surface structure 17 is shown on the outside of the spring housing. This surface structure 17 can be of any shape in order to optimally fix the temple insert in the spectacle temple. In FIG. 4c now the interior view of the opened spectacle joint is shown. The individual components and features of the joint according to the invention are clearly shown.

LIST OF REFERENCE NUMERALS 1 spectacle joint
2 front part
3 temple part
4 spring element
5 inner side of cuboid
6 axis of rotation
7 spring housing
8 chamfer
9 holding lug
10 temple insert
11 base plate
12 mounting device
13 hinging hooks
14 compression spring
15 pin
16 cavity/bore
17 surface structure

The invention claimed is:

1. A joint for a spectacle frame with temples, wherein the joint consists of a front part, a temple part and a compression spring element, wherein the temple part consists of a cuboid open towards the front, along one side and on the inside, and short, inwardly directed axes of rotation are arranged on the opposing inner sides of the open cuboid, and wherein the front part is constructed in the form of a holding lug, wherein the holding lug is formed to be insertable into the open cuboid of the temple part, and wherein hinging hooks in the form of recesses are arranged in two opposing outer surfaces of the holding lug, which can be hung in the short axes of rotation of the temple part, whereby the front part and the temple part can be hingedly connected with one another and the compression spring element is arranged between the front part and the temple part in such a way that the front part is fixed movably on the axes of rotation of the temple part.

2. The joint, according to claim 1, characterized in that the temple part has an insert body which extends rearwardly from the temple part to the spectacle temple, wherein the insert body is formed to be insertable into the spectacle temple.

3. The joint, according to claim 2, characterized in that the insert body has a cavity for forming a spring housing and that the temple part has a bore on the rear wall of the open cuboid so that the compression spring element can be introduced through the temple part into the cavity of the insert body.

4. The joint, according to claim 1, characterized in that the front part further comprises a base plate which is arranged at the front part of the holding lug.

5. The joint, according to claim 4, characterized in that the base plate is formed in such a way that in the opened state of the spectacle temple the base plate covers the side of the cuboid of the temple part which is open at the front.

6. The joint, according to claim 4, characterized in that a connecting element is arranged on the forward-facing side of the base plate, which is provided for fastening the frame for the spectacle glasses.

7. The joint, according to claim 1, characterized in that the holding lug has a radius at the outside rear and a rounded edge at the inside rear.

8. The joint, according to claim 1, characterized in that the compression spring element consists of a compression spring and a pin, wherein the pin is arranged in the direction of the holding lug.

9. The joint, according to claim 1, characterized in that the holding lug on the side directed to the pin is formed in such a way that at an angular range of the joint parts of 90° to 108° relative to one another a constant compressive force is exerted on the compression spring.

10. The joint, according to claim 9, characterized in that the pin is fixedly or releasably connected to the compression spring.

11. The joint, according to claim 1, characterized in that the compression spring element is in the form of a leaf spring and/or in the form of an elastomer part and/or moulded rubber part.

12. A joint for a spectacle frame with temples, wherein the joint consists of a front part, a temple part and a compression spring element, wherein the front part consists of a cuboid which is open towards the front, along one side and on the inside, and short, inwardly directed axes of rotation are arranged on the mutually opposite inner sides of the open cuboid, and wherein the temple part is constructed in the form of a holding lug, wherein the holding lug is formed to be insertable into the open cuboid of the front part and hinging hooks in the form of recesses are arranged in two opposing outer surfaces of the holding lug, which can be suspended in the short axes of rotation of the front part, whereby the front part and the temple part are connectable to one another in an articulated manner and the compression spring element is arranged between the front part and the temple part in such a way that the temple part is fixed movably on the axes of rotation of the front part.

* * * * *